June 3, 1941.    E. S. CORNELL, JR    2,244,054
PRESSURE-TIGHT BEARING
Filed Dec. 15, 1938    2 Sheets-Sheet 1
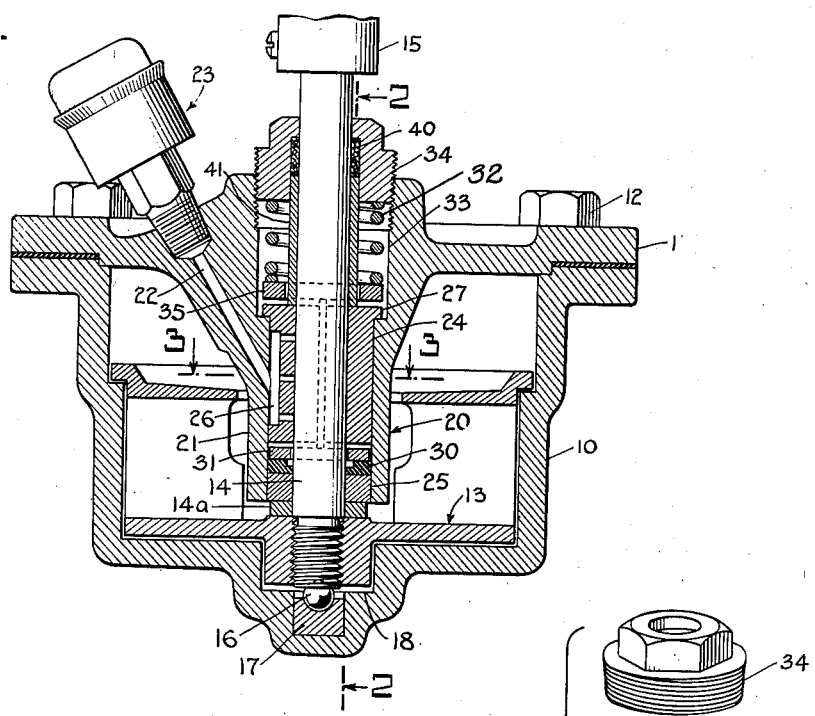
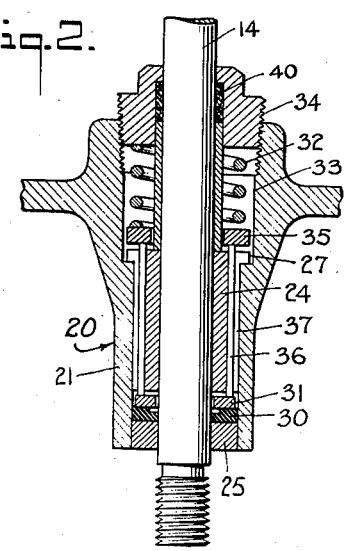
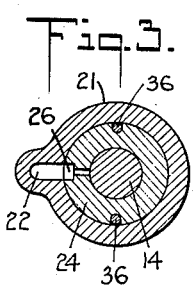
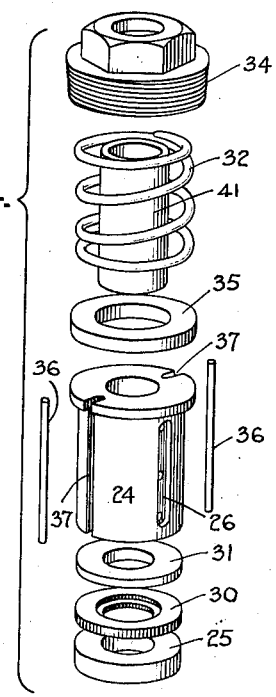
INVENTOR
Edward S. Cornell, Jr.
BY Henry J. Lucke
HIS ATTORNEY June 3, 1941.  E. S. CORNELL, JR  2,244,054
PRESSURE-TIGHT BEARING
Filed Dec. 15, 1938  2 Sheets-Sheet 2
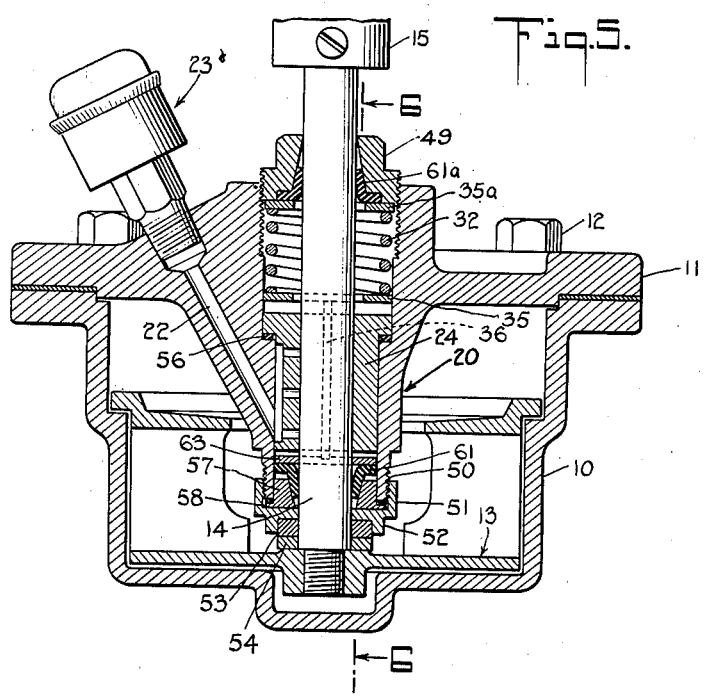
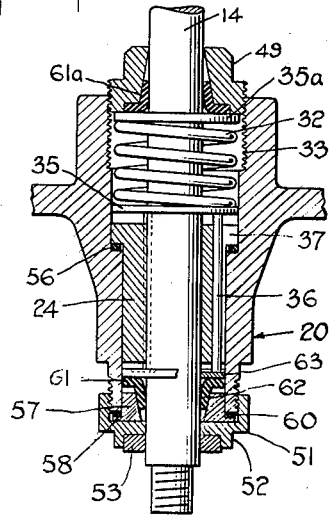
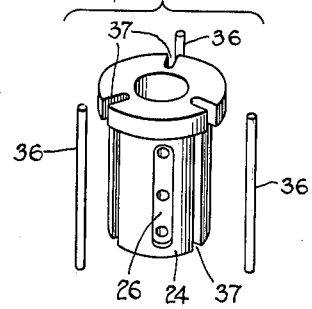
INVENTOR
Edward S. Cornell, Jr.
BY
HIS ATTORNEY Patented June 3, 1941

2,244,054

UNITED STATES PATENT OFFICE 2,244,054

PRESSURE-TIGHT BEARING

Edward S. Cornell, Jr., Larchmont, N. Y.

Application December 15, 1938, Serial No. 245,808

14 Claims. (Cl. 308—36.2)

This invention relates to bearings.

Particularly, the invention relates to an improved bearing for shafts or the like, which are subject to submersion in whole or in part in fluid under pressure, and provides means wholly externally adjustable for compressing suitable packing material about a submerged portion of such shaft for sealing the bearing against leakage of fluid.

It is an object of the invention to provide an improved bearing for such mechanisms as centrifugal pumps or the like, in which the impeller and lower shaft mounting may be wholly or partially submerged in water or other fluid. The invention is particularly suitable for a centrifugal pump for circulating hot water through the piping of a heating system, in which application it is especially desirable that neither leakage of water nor contamination of the water by grease or other lubricant occur.

In preferred embodiments of the present invention, the bearing assembly may include mutually spaced bushings within which the shaft rotates, one or more of the said bushings being maintained against accidental rotative or axial displacement, within a suitable housing. A ring of compressible packing, of suitable water and grease proof quality, is confined between the said bushings, and preferably in operative association with one of them. A cap, which may be a washer or similar metallic annulus loosely confined within the housing to have free axial and rotative movement therein, rests upon the compressible ring. By suitable means, the ring of packing material may be compressed between the annulus and the lower bushing, to engage the shaft tightly and prevent leakage of the pumped fluid into the bearing area, or contamination of the pumped fluid by the lubricant employed.

A feature of this invention resides in maintaining the ring of suitable packing material in tight engagement with the shaft by suitable externally adjustable compression means, and therewith associated structure arranged to operate upon the packing ring to urge the same into desired engagement with the shaft. The compression means and its associated structure are at all times accessible and adjustable without disturbance or re-arrangement of the bearing elements. The pressure exerted by the said compression means may be controlled by a suitable screw-threaded adjustment plug or equivalent means, the operation of which serves to increase or decrease the pressure exerted upon the packing ring.

The present application is a continuation in part, of my presently co-pending application filed October 28, 1937, Serial No. 171,541.

Other features and advantages will hereinafter appear.

In the accompanying drawings—

Fig. 1 is a vertical section of an impeller housing of a centrifugal pump, the bearing for the shaft of which embodies the present invention;

Fig. 2 is a vertical section of the bearing of Fig. 1, showing suitable means for maintaining the packing ring in proper compression;

Fig. 3 is a detail plan section, taken through the lines 3—3 of Fig. 1;

Fig. 4 is an exploded perspective, detailing component parts of one form of the bearing;

Fig. 5 is a view similar to that of Fig. 1, but incorporating a second embodiment of bearing made pursuant to the present invention;

Fig. 6 is an elevation, partly in section, illustrating the action of the packing ring compression means; and Fig. 7 is an exploded perspective view of the lubricating bushing and packing ring compression devices of the embodiment of Fig. 5.

Referring to Fig. 1, 10 represents the impeller housing of a centrifugal pump. A cap or cover-plate 11 is shown secured thereto by suitable bolts 12. An impeller 13 may be removably secured to a rotatable shaft 14, as by the indicated screw-thread connection; the shaft 14 is shown connected, as by a coupling 15, to suitable driving means (not shown).

The shaft 14 may be supported upon and generally aligned by a suitable thrust bearing such as the alloy steel ball 16, positioned in a suitable depression in a bearing block 17. Such thrust bearing is shown contained within a cup formation 18, which may be formed in the casing 10 and therefore submerged at all times during the operation of the pump; such arrangement affords lubrication of ball 16 and bearing block 17 by the water or other fluid being pumped.

The shaft 14 is mounted for rotative movement within a bearing housing 20, which may be formed as an integral part of, and concentric with, cover-plate 11. A downwardly extending neck 21 has a suitable grease channel 22, provided with conventional lubricant supply means 23.

The shaft 14 passes through the mutually spaced bushings 24, 25, said bushings being bronze, brass, or other suitable anti-friction material. Bushing 24 may have suitable lubricant-distributing passages 26, communicating with the channel 22, see Figs. 1, 3 and 4. Bushings 24 and 25 may be held against accidental axial and rotative displacement within the neck 21 by positive keying means, or by making the stated bushings of suitable diameter for a drive fit within neck 21. It is to be understood, however, that both bushings are removably positioned within the housing 20.

As appears from Fig. 1, the entire bearing assembly may be submerged in the fluid being pumped during operation of the impeller 13, of the pump.

Novel means are employed to prevent leakage of the fluid upwardly along the rotating shaft, or to prevent contamination of the pumped material by the grease or other lubricant employed.

As shown in Fig. 2, the bushings 24 and 25 are maintained in suitable spaced relationship within the housing 20. Thus, a shoulder 27 or equivalent structure serves to establish the insertion of bushing 24 at a predetermined location within the housing 20; the bushing 25 is drive-fitted into position at the lower terminus of the housing neck 21. Contained within the space bounded by the said bushings and the neck 21, is a compressible packing ring 30, of a suitable grease- and water-proof material. "Neoprene" or similar synthetic rubber-like material has been found satisfactory. Preferably, the ring 30 is of suitable external and internal diameter to fit snugly within the housing 21 and to engage shaft 14 while the ring is in normal or undeformed status. The ring 30 is preferably cupped, as shown in Figs. 1 and 4, thereby having a relatively small surface contact with the shaft 14; the cupping of ring 30 also serves to make it more readily conformable under compression.

Under suitable compression, the ring 30 engages the shaft 14 tightly, and is also urged into intimate contact with the housing 20, filling surface irregularities or other imperfections in the wall of the housing. In this manner, an adequate seal against leakage of pumped liquid upwardly along the shaft 14 and/or wall of housing 20, and against contamination of the stated liquid by the lubricant, is effected.

To maintain the packing ring 30 in compressed status, and thus in fluid-sealing contact with the shaft 14, there is provided a novel organization of elements, in which a suitable cap member, such as the washer 31, which is preferably relatively loosely confined within the housing neck 21, is arranged to be pressed downwardly against the upper surface of ring 30 by a suitable coil expansile spring 32, the compressive action of such spring being transmitted to the washer 31 by means of a bearing washer 35 and a set of mutually spaced pins 36, said pins being, within usual manufacturing tolerances, of equal length. The compression spring may encompass the shaft 14, as shown, and may be housed within a suitable chamber 33 in the upper portion of housing 20. Spring 32 may be confined between a threaded adjustment plug or bonnet 34 and the washer 35, the latter, as indicated in Fig. 2, being normally wholly free of contact with the bearing structure per se. As shown in Figs. 1 and 2, the pins 36 are urged downwardly against the washer 31, compressing the ring 30 against bushing 25, and expanding the packing ring 30 about the rotating shaft 14 and against the inner wall of neck 21. The pins 36 may be slidably contained within suitable longitudinal slots 37, milled, as shown, or otherwise formed in the bushing 24.

The packing ring 30 is thus maintained in uniformly compressed status and in correlative fluid-sealing engagement with shaft 14 at all times. The compressive force exerted by the compression spring 32 operates uniformly upon the packing ring 30, and provides automatic compensation for wear of the packing ring 30.

As appears clearly from Fig. 2, the pins 36 serve to locate the washer 35 above the bushing 24, and thus provide for adequate play or downward movement of the washer 35.

As indicated in Fig. 1, a bearing washer or spacer 14a may be employed to limit upward movement of the shaft and impeller assembly. Such spacer 14a may be of suitable anti-friction material of adequate resistance to wear. Lubrication of the spacer 14a and of bushing 25 is adequately effected by the submergence of these elements in the water or other liquid being pumped.

Adjustment of the degree of compression of spring 32 may be accomplished by suitable manipulation of the threaded adjustment nut 34, being preferably of brass or other non-rusting metal.

To prevent leakage of grease or other lubricant upwardly along shaft 14 and thence past the nut 34, there may be provided a secondary packing means comprising a ring 40 of suitable packing material contained within the nut 34, and arranged to be compressed about shaft 14, by a sleeve 41, of suitable wall thickness, which fits slidably on the shaft 14 and is arranged to bear against the upper surface of the bushing 24. As indicated, the sleeve 41 preferably extends into plug 34, and bears directly against the packing ring 40. By turning adjustment plug 34 to compress ring 30, ring 40 is simultaneously compressed.

As appears from the above, the adjustment of the packing ring 30, or any replacement of the adjustment structure may be effected entirely externally of the pump structure, and without disturbing the main bearing bushing 24. When replacement of packing ring 30 or bushing 25 is required, the impeller casing 10 is removed, thus exposing the bearing assembly and the impeller; the impeller may be readily disconnected from the shaft, by unthreading the same, thus affording full access to the component parts.

In the embodiments illustrated in Figs. 5 to 7, inclusive, the housing 20 is provided, at its lower extremity, with a screw-threaded neck 50, to which is secured a suitable thrust bearing holder 51, having a suitable central aperture for the free rotation of the impeller shaft 14, and arranged to confine, between its downwardly extending annular shoulder 52 and the bottom plate of the impeller 13, a pair of suitable thrust washers 53, 54. Preferably, the lower washer, 54, is of a stainless iron, or like material, whereas washer 53 is advantageously formed from suitable bearing bronze.

The main journal bushing 24 is provided with lubricant distribution means 26, and has a suitable plurality—in this instance three—of vertically disposed compression-pin slots 37. Bushing 24 may be keyed into said housing to maintain its fixed relationship thereto, but it has been found that a drive fit of the bushing within the housing is adequate to prevent the accidental rotative or axial displacement of the said bushing. If preferred, a packing ring 56 may be confined between the head portion of the bushing and the illustrated shoulder of the housing 20.

A bushing 57 having a frusto-conical central bore of diameter affording a suitable clearance between the bushing and shaft 14, is suitably fixedly supported at the lower end of the housing 20, as by the thrust bearing holder 51. Said bushing 57 is provided with a shoulder 58 between which and the lower surface of the threaded portion 50 of housing 20 may be confined a suitable packing washer 60. When the thrust bearing holder 51 is screwed tightly into position, it will be evident that the bushing 57 is maintained in fixed relationship within the housing 20.

The respective bushings 24 and 57 are thus affixed within the housing in suitable spaced relationship, affording a chamber within which may be confined the packing material and the packing material compressing means.

As shown in Figs. 5 and 6, the packing material may be in the form of a collar 61, a neck portion 62 of which is generally frusto-conical in contour. Relatively loosely disposed intermediate said packing 61 and the under-side of bushing 24, is placed an annular cap 63, of metal or any substantially non-compressible material. Said cap may have a peripheral shoulder, as indicated in Fig. 6, forming guide means for maintaining the compression pins 36 in desired alignment.

The packing collar compression means, in the instant embodiment, may comprise a suitable coil spring 32, confined within a chamber 33 at the upper portion of the housing 20 and between a lower bearing plate 35 and an upper bearing plate 35a. The lower bearing plate rests upon the pins 36, which, as shown, terminate suitably above the upper surface of bushing 24. The compressive force of the spring is transmitted by means of the pins 36 to the annular cap 63. Under the downward pressure exerted by the cap 63 upon the packing material 61, the neck portion 62 of the packing is cammed by the bushing 57 tightly about the shaft.

The continued pressure exerted upon said packing material automatically compensates for wear of the packing by maintaining the packing in engagement with the shaft 14. It is desirable, therefore, that the length of neck 62 of the packing material be suitable to dispose the annular rim of the packing 61 above the surface of the bushing 57.

The external spring compression adjustment means, represented by the nut 49, may, in substitution for the packing 40 and sleeve 41 of the embodiment of Fig. 1, employ a packing 61a similar in design and operability to the lower packing 61. Accordingly, the adjustment nut 49 may be provided with a suitable frusto-conical central bore, and have a lower configuration affording means for confining such packing 61a against the upper surface of bearing washer 35a. The neck portion of packing 61a is thereby maintained in tight engagement with shaft 14.

As is clearly apparent from the Figs. 5 and 6, it is desirable that the packing 61, 61a be relatively stiff, and the thickness of wall of the packing neck-portion be substantially uniform, and greater than the minimum clearance between the frusto-conical bores of the bushing 57 and adjustment nut 49. It is also desirable that the slope of such bores be such as to insure tight engagement of the packing with the shaft and with the wall of the bores intermediate the upper and lower surfaces of the bushing and/or the adjustment nut. By suitable proportion of wall thickness and slope of bore, the "crowding" of the packing into fluid-tight engagement with the shaft and bushing wall, induced by pressure on the surface of the packing, may be employed to maximum effect.

Whereas I have described my invention by reference to specific forms thereof, it will be understood that many changes and modifications may be made within the spirit of the invention.

I claim:

1. A bearing for a drive shaft, including a housing, a plurality of shaft receiving bushings disposed within said housing in substantially fixed mutually spaced relationship, packing means disposed within said housing and between said bushings, and spring means disposed remote from said bushings and operatively associated with said packing means to urge said packing into fluid-sealing engagement with said shaft, said spring means being adjustable externally of said housing.

2. A bearing for a rotatable shaft, comprising a housing, a plurality of shaft-receiving bushings disposed therein in fixed mutually spaced relationship, packing means disposed between said bushings and within said housing, spring means disposed remote from said bushings, means operatively associated with said spring means for urging said packing means into engagement with the rotating shaft, and means operable externally of said housing for regulating the compressive force exerted upon said packing means.

3. A bearing comprising a plurality of mutually spaced bushings arranged to receive a shaft, a housing for said bushings, said bushings being restrained against displacement within said housing, a body of compressible material in operative engagement with said shaft and disposed within said housing between said bushings, a relatively non-compressible cap arranged to press upon said compressible material, a compression spring mounted remote from said bushings, and means interposed between said compression spring and said cap to transmit the spring pressure to said cap, whereby said compressible material is urged into close engagement with said rotating shaft.

4. A bearing assembly for journalling a shaft, including a plurality of bushings disposed in fixed mutually spaced relationship within a housing, a body of compressible packing material confined between said bushings and in operative relationship with said shaft, substantially non-compressible cap means arranged to press upon said body of compressible material, an adjustable member, an annular bearing plate, a compression spring confined between said adjustable member and said bearing plate, and means for transmitting said compression spring pressure to the said cap means to urge said compressible body into close engagement with said shaft.

5. A bearing for journalling a shaft, including a plurality of mutually spaced apart bushings arranged to receive said shaft for rotation therein, means supporting said bushings against axial or rotative movement, a ring of compressible packing material confined within said supporting means and between said bushings, a metal cap arranged to press upon said ring of packing material, a plurality of axially slidable members communicating with said cap, and spring means arranged to bear against said slidable members and exert a downward pressure thereon to compress the packing material about said shaft.

6. A pressure-tight bearing for a submerged shaft, including an externally lubricated shaft bushing, a second shaft-receiving bushing spaced therefrom, housing means for maintaining said bushings in spaced relationship, compressible shaft-packing material confined within said housing means intermediate said bushings, substantially non-compressible means disposed within said housing and overlying said packing means, compression spring means disposed remote from said bushings and said packing material, means for adjusting the degree of compression of said spring, and means including a plurality of slidable pins arranged longitudinally of said shaft for transmitting the spring pressure to said compressible packing material.

7. A pressure-tight bearing assembly, comprising a plurality of mutually spaced apart bushings arranged to receive said shaft, a housing for said bushings arranged to maintain said bushings against axial or rotative movement in said housing in operative engagement with said shaft, a ring of compressible packing material confined between said bushings, an annulus of non-compressible material arranged to press upon said ring of compressible material, a compression spring encompassing said shaft and confined between an externally adjustable anchoring member and an axially displaceable bearing plate, and means for supporting said bearing plate at a plurality of points, said means including longitudinally displaceable members extending between said bearing plate and said non-compressible annulus, whereby the pressure exerted by said compression spring is transmitted to said non-compressible annulus for compressing the packing ring about said shaft.

8. A pressure-tight bearing for journalling a submerged shaft, comprising a plurality of bushings arranged to receive said shaft for rotation therein, housing means for confining said bushings in mutual spaced relationship, within said housing, a ring of compressible packing material confined between said bushings and engaging the stated shaft and the inner wall of said housing, a metal cap supported on said packing ring and loosely confined between said bushings, and means for urging said cap downwardly against said packing ring to urge it into lateral expansion, said means comprising a plurality of pins slidable vertically within said housing, a compression spring arranged to bear against said pins and urge them into downward movement against said cap, and means for adjusting the degree of compression of said spring.

9. A pressure-tight bearing for journalling a shaft, comprising a housing, a plurality of bushings of suitable bearing metal encircling said shaft and maintained in fixed mutual spaced relationship within said housing, means for lubricating said shaft and said bushings, a ring of compressible packing material surrounding said shaft and disposed in the space between said bushings, and means including an adjustment nut located externally of said bushings and having a central bore arranged for the passage of said shaft therethrough and a plurality of axially movable elements operatively associated with said nut and said packing material to operate upon said packing material to urge the said packing into engagement with the shaft upon suitable manipulation of the adjustment nut.

10. A pressure-tight bearing for journalling a rotating shaft, comprising a housing, a plurality of bushings of suitable bearing metal encircling said shaft and maintained within said housing in fixed mutually spaced relationship, means for lubricating said bushings and said shaft, packing means surrounding said shaft and disposed in the space between said bushings, said packing means including a substantially non-compressible annular cap and compressible packing material disposed beneath said cap, and means for displacing said packing material into pressure-tight and fluid-tight engagement with said shaft, said means including an adjustment nut located externally of said housing, a plurality of slidable vertically disposed elements passing longitudinally along one of said bushings and bearing upon said packing means cap element, and compression spring means disposed between said adjustment nut and said vertical elements and operatively associated with the latter to effect a compressive force upon said packing means.

11. A pressure-tight shaft bearing, including a housing, shaft-receiving bushings disposed within said housing and secured in fixed spaced relationship therein, lubrication means for said shaft, packing means disposed within said housing and intermediate said bushings, cam means operatively associated with said packing means, and spring means adjustable externally of said housing and operatively associated with said packing means to cam said packing into engagement with said shaft.

12. A bearing for a shaft, including a housing, a plurality of bushings disposed within said housing and secured in spaced relationship therein, one of said bushings having a bore sloping in the direction of the shaft and having a minimum diameter substantially greater than the shaft diameter, packing means disposed within said housing intermediate said bushings and having a downwardly extending neck disposed intermediate said sloping bore and said shaft, said neck having a thickness greater than the minimum clearance between said bushing and said shaft, and means adjustable externally of said housing operatively associated with said packing means for moving the neck portion thereof downwardly along the wall of said sloping bore and into engagement with said shaft.

13. A pressure-tight shaft bearing, including a housing, shaft-receiving bushings disposed within said housing and maintained in fixed mutually spaced relationship, one of said bushings having a frusto-conical bore sloping in the direction of the shaft, packing means having a frusto-conical neck portion surrounding said shaft and disposed intermediate the bore of said bushing and said shaft, non-compressible cap means for said packing means, compression spring means disposed remote from said packing means, means independent of the bushings for transmitting the pressure of said spring to said packing cap means, and means adjustable externally of said housing for regulating the pressure exerted upon said cap means.

14. A pressure-tight shaft bearing, including a housing, shaft-receiving bushings disposed within said housing and maintained in fixed mutually spaced relationship, one of said bushings having a frusto-conical bore sloping in the direction of the shaft, packing means having a frusto-conical neck portion surrounding said shaft and disposed intermediate the bore of said bushing and said shaft, and means for crowding said packing means against said shaft and the wall of said bushing, comprising non-compressible cap means supported on said packing means, pin means operatively associated with said cap means and extending longitudinally of said shaft and to a point remote from said bushings, spring means arranged to press downwardly upon said pin means, and means adjustable externally of said housing for regulating the compressive effect of said spring.

EDWARD S. CORNELL, Jr.